US009738310B2

(12) United States Patent
Fischer et al.

(10) Patent No.: US 9,738,310 B2
(45) Date of Patent: Aug. 22, 2017

(54) STEERING SYSTEM FOR AN AGRICULTURAL VEHICLE

(71) Applicant: CLAAS SELBSTFAHRENDE ERNTEMASCHINEN GMBH, Harsewidenkel (DE)

(72) Inventors: Frederic Fischer, Arnsberg (DE); Detlev Meiners, Marienfeld (DE); Bastian Kriebel, Muenster (DE); Thilo Krause, Glinde (DE); Daniel Irmer, Herzebrock-Clarholz (DE); Sebastian Juette, Delbrueck (DE); Philipp Sundermeier, Delbrueck (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 14/955,472

(22) Filed: Dec. 1, 2015

(65) Prior Publication Data

US 2016/0159391 A1 Jun. 9, 2016

(30) Foreign Application Priority Data

Dec. 9, 2014 (DE) .......................... 10 2014 118 229

(51) Int. Cl.
| B62D 6/00 | (2006.01) |
| B62D 3/14 | (2006.01) |
| B62D 5/00 | (2006.01) |
| B62D 5/065 | (2006.01) |
| B62D 1/22 | (2006.01) |

(Continued)

(52) U.S. Cl.
CPC ................. B62D 6/00 (2013.01); B62D 1/22 (2013.01); B62D 3/14 (2013.01); B62D 5/008 (2013.01); B62D 5/065 (2013.01); B62D 5/093 (2013.01); A01B 69/007 (2013.01)

(58) Field of Classification Search
CPC ... B62D 6/00; B62D 1/22; B62D 3/14; B62D 5/008; B62D 5/065; B62D 5/093; A01B 69/007
See application file for complete search history.

(56) References Cited

U.S. PATENT DOCUMENTS 4,627,509 A * 12/1986 Adams ..................... B62D 5/06
180/422
7,677,351 B2 3/2010 Biener
(Continued)

FOREIGN PATENT DOCUMENTS

| DE | 102005025966 | 12/2006 |
| DE | 10 2005 035 171 | 2/2007 |
| EP | 2 020 169 | 2/2009 |

*Primary Examiner* — Tony Winner
*Assistant Examiner* — Marlon A Arce
(74) *Attorney, Agent, or Firm* — Michael J. Striker

(57) ABSTRACT

A steering system for an agricultural vehicle has at least one steering cylinder for changing a steering angle of the agricultural vehicle, a hydraulic main steering valve for pressurizing the at least one steering cylinder, a steering transducer for actuating the main steering valve, a steering boost for controlling an adjustment characteristic between the steering transducer and the at least one steering cylinder and a sensor system for detecting an external signal of the agricultural vehicle. The steering boost controls the adjustment characteristic on the basis of the detected external signal.

19 Claims, 3 Drawing Sheets

(51) Int. Cl.
  *B62D 5/093* (2006.01)
  *A01B 69/00* (2006.01)

(56) References Cited

U.S. PATENT DOCUMENTS

2007/0251754 A1* 11/2007 Webert ................... B62D 5/063
                                                                            180/417
2008/0202841 A1*  8/2008 Biener ................... B62D 5/093
                                                                            180/403
2011/0066337 A1*  3/2011 Kormann ............. A01D 43/073
                                                                              701/50

\* cited by examiner

STEERING SYSTEM FOR AN AGRICULTURAL VEHICLE

CROSS-REFERENCE TO A RELATED APPLICATION

The invention described and claimed hereinbelow is also described in German Patent Application DE 10 2014 118 229.4, filed on Dec. 9, 2014. The German Patent Application, the subject matters of which is incorporated herein by reference, provides the basis for a claim of priority of invention under 35 U.S.C. 119(a)-(d).

BACKGROUND OF THE INVENTION

The present invention relates to a steering system for an agricultural vehicle.

Agricultural vehicles such as combine harvesters, for example, regularly comprise a hydrostatic steering system. A conventional hydrostatic steering system is based on the principle that the steering transducer, i.e., a steering wheel, for example, is mechanically connected to a hydraulic steering valve, which, depending on the extent of actuation, feeds a certain volume of oil provided by a hydraulic pump to a steering cylinder and therefore pressurizes this steering cylinder. The deflection of the steering piston of the steering cylinder is changed in accordance with this volume of oil and depending on the direction in which the steering cylinder is pressurized, whereby the steering-knuckle steering is actuated and the steering angle of the agricultural vehicle is adjusted. Such hydraulic steering valves, which are mechanically actuated by the steering wheel and therefore have a fixed steering ratio, are defined here and in the following as the relationship between the extent of actuation of the steering transducer and the adjustment of the steering cylinder, as steering units.

Furthermore, it is known from the prior art, and especially from DE 10 2005 025 966 A1, to provide, in addition to such a steering unit, an electrohydraulic valve, which is electrically controllable by a control module and can pressurize the steering cylinder, using oil, in an identical manner either independently of the steering unit or simultaneously with the steering unit, with the result that the steering angle is changed to a corresponding extent. Such an independent control by the control module is used to implement an autopilot function such that the steering angle is therefore readjusted in accordance with a set wheel track without the steering wheel or the steering unit being actuated. By pressurizing the steering cylinder simultaneously by the steering unit and by the electrohydraulic valve, however, the steering ratio is increased and the time required for the wheels of the agricultural vehicle to reach a certain steering angle is shortened. This results from the fact that both the steering unit as well as the electrohydraulic valve pressurize the steering cylinder, possibly each using a separate pump. Such a support of the steering procedure is also referred to as "fast steering".

It is also known from the prior art to activate the electrohydraulic valve for this type of steering support when the steering wheel is actuated either particularly rapidly, in the sense of an angular velocity, or through a particularly large angle of rotation. The reason for this is that such situations are usually an indication that a turning maneuver is supposed to be carried out with a turning circle that is as small as possible, which makes it necessary to boost the steering by means of the electrohydraulic valve. The vehicle regularly must execute a 180° turn in the headland of a field, in particular, in order to travel from one set wheel track through the crop area to the next set wheel track through the crop area to be driven along. According to another option, the operator of the steering system manually activates the electrohydraulic valve for providing the steering support when the headland area is reached, for example.

A disadvantage of the steering systems from the prior art, however, is that they are designed especially for such a turning maneuver in the headland. This relates both to its special effect on the steering behavior and to the triggering event, e.g., a maximum steering-wheel actuation for a 180° turn. Other situations in which changing the steering behavior basically makes sense are also conceivable, however, wherein this change in the steering behavior can also have requirements that differ from those for a 180° turn.

SUMMARY OF THE INVENTION

The present invention overcomes the shortcomings of known arts, such as those mentioned above.

The invention provides a steering system for an agricultural vehicle in such a way that it reacts more flexibly and in a more differentiated manner to different situations in which a change in steering behavior is involved.

One aspect of the invention is the finding that adapting the steering behavior or the characteristic behavior with which a steering transducer adjusts the steering angle of the agricultural vehicle, referred to here and in the following as an adjustment characteristic, does not need to be based exclusively on a detected steering behavior in the sense of an actuation of the steering transducer or on a manual trigger, but rather is based on external signal of the agricultural vehicle associated with a sensor. The term "external signal" in the present case refers to any signal or any measurable property that does not arise from the agricultural vehicle itself in the narrower sense. The concept of the external signal in this case therefore does not include, for example, an extent of actuation or an actuating speed of the steering transducer, the steering angle, or the ground speed of the agricultural vehicle.

The proposed, additional consideration of such an external signal permits an automatic and, therefore, early activation of an adaptation of the adjustment characteristic, i.e., even before the steering movement per se is carried out. On the other hand, this also makes it possible to carry out such a differentiated, situation-dependent adaptation, since there is no longer simply a binary reaction to a limit value or the like being exceeded. A "fast steering" therefore reacts differently or is activated differently depending on an external situation.

Such an adaptation can relate to different features of the adjustment characteristic. The steering ratio can therefore be adapted in the above-described sense in order to achieve a greater change in the steering angle also with a small actuation travel of the steering transducer, for example, adaptation of the turning circle diameter and to the steering angle adjustment time. In this case and in the following, time is understood to mean the time within which the steering angle of the agricultural vehicle sets in, in accordance with the requirement of the steering transducer and with consideration for the steering ratio.

According to an embodiment, different adaptation parameters for the adjustment characteristics are stored for a large number of situations and these are then applied depending on the situation that is detected.

In another embodiment, the main steering valve is a mechanical valve having a fixed valve ratio, which is defined here as the ratio between the extent of actuation of the particular valve and the volume of hydraulic fluid delivered, and can also be an electrohydraulic valve having a valve ratio which is changeable per se. In the latter case, an additional valve for acting on the steering cylinder with pressure is omitted. Alternatives are considered, however, as explained below and/or claimed.

Also, a possibility for reducing the steering angle adjustment time is to increase the capacity of the device, e.g., a pump, which generates the pressure for the hydraulic fluid. Detecting various environmental states carried out by processing a corresponding external signal is particularly relevant for an adaptation of the adjustment characteristics according to the invention, where the detection of an external signal by an external implement of the agricultural vehicle.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

The steering system according to the invention is for an agricultural vehicle 1, for example, a combine harvester 1*a*. This agricultural vehicle 1 is apparent in FIGS. 2 and 3 in particular. The steering system according to the invention comprises at least one steering cylinder 2*a, b* for changing a steering angle 3 of the agricultural vehicle 1.

Figure 1:
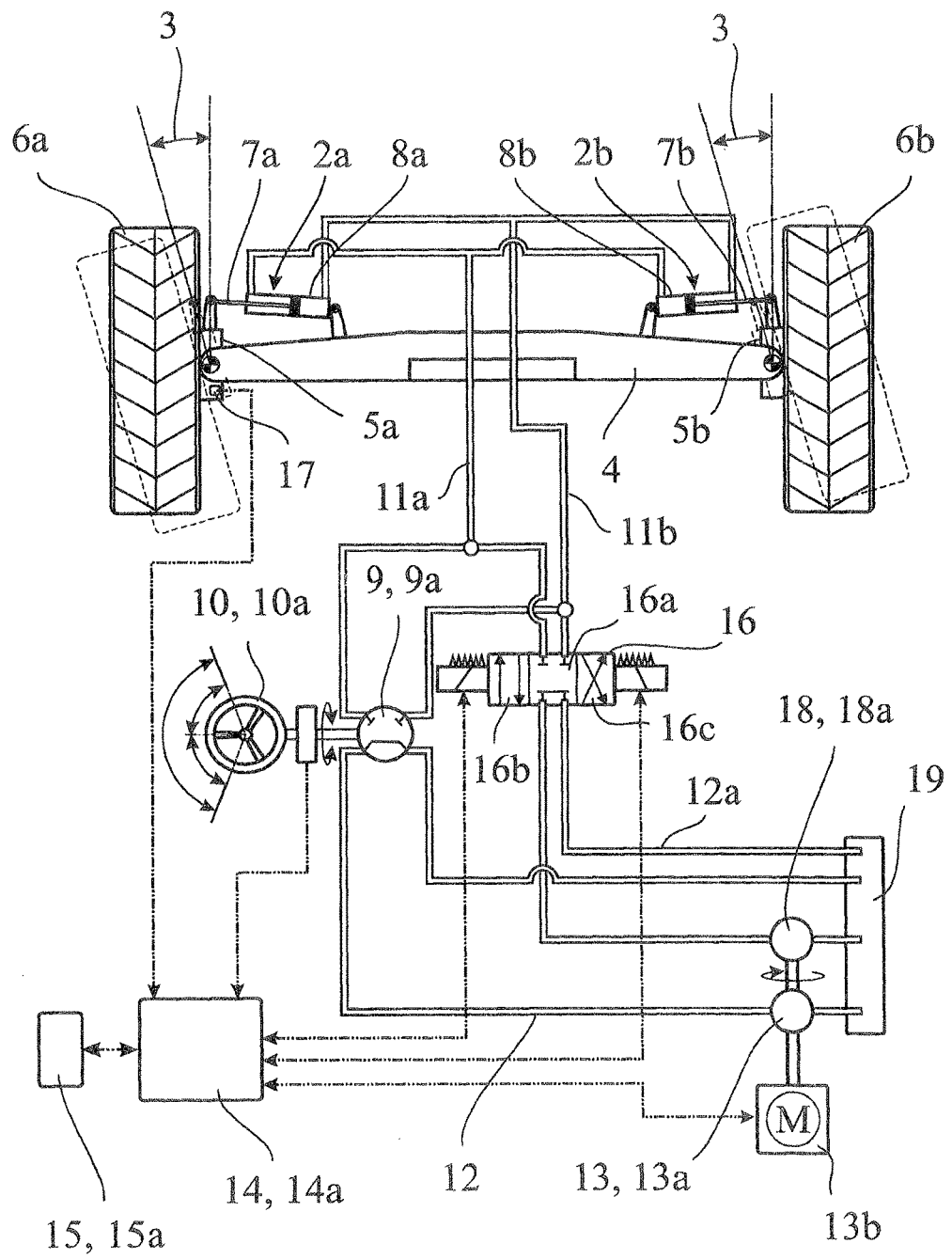
FIG. 1 shows a schematic view of a steering system according to the invention for an agricultural vehicle.

According to the representation in FIG. 1, in this agricultural vehicle 1, the rear axle 4 is steered, wherein wheel supports 5*a, b* having a wheel 6*a, b*, respectively, are mounted on the rear axle. The steering angle 3 is specified by the steering cylinders 2*a, b*, and therefore, the steering angle is changed by the steering cylinders, and specifically in such a way that a piston rod 7*a, b* of the steering cylinder 2*a, b*, respectively, is connected to the wheel support 5*a, b*, respectively, and a cylinder housing 8*a, b* of the steering cylinder 2*a, b*, respectively, is connected to the rear axle 4.

The steering system according to the invention also comprises a hydraulic main steering valve 9 for acting upon the at least one steering cylinder 2*a, b* with pressure. The hydraulic main steering valve 9 comprises a signal transducer 10, a steering wheel 10*a* in this case, for actuating the main steering valve 9. In particular, the main steering valve 9 is set up to introduce hydraulic fluid into either the first hydraulic line 11*a* or into the second hydraulic line 11*b* under pressure during an actuation of the steering transducer 10 out of its current position, which is a rotation of the steering wheel 10*a* in this case.

The selection of the particular hydraulic line 11*a, b* into which the hydraulic fluid is introduced depends on the direction of actuation of the signal transducer 10 and the volume of introduced hydraulic fluid depends on the extent of the actuation. The result is a corresponding change in the position of the piston rods 7*a, b* of the steering cylinders 2*a, b*, and, therefore, of the steering angle 3, and a return flow of a corresponding volume of hydraulic fluid from the respective other hydraulic line 11*a, b* through the main steering valve 9. The main steering valve 9 is supplied with hydraulic fluid from a main line system 12, which hydraulic fluid is delivered from a pressure supply source 13, which is a pump 13*a* operated by a pump motor 13*b* in this case. Without further actuation of the main steering valve 9 and after conclusion of the above-described position change of the piston rods 7*a, b*, the hydraulic fluid is simply conducted within the main line system 12 by the main steering valve 9.

The steering system according to the invention also comprises a steering boost 14 for adapting an adjustment characteristic between the steering transducer 10 and the at least one steering cylinder 2*a, b*. As was already described above, this adjustment characteristic refers very generally to any qualitative or quantitative property that describes the change of the steering angle 3 as a result of an actuation of the steering transducer 10. Special examples of this are also explained below. Since this adjustment characteristic is related to the entire active chain between the steering transducer 10 and the steering angle 3, it is influenced not only by the steering transducer 10 and the at least one steering cylinder 2*a, b*, but also substantially by the main steering valve 9.

The steering system according to the invention also comprises a sensor system 15 for detecting an external signal of the agricultural vehicle 1.

The steering system according to the invention is characterized in that the steering boost 14 is set up to adapt the adjustment characteristic on the basis of the detected external signal. Basically any type and scope of this adaptation are possible. The only decisive aspect is that the type and scope also be based on the detected environmental state, for which special examples are described below. This expressly includes the possibility that the adaptation of the adjustment characteristic is also based on an actuation of the steering transducer 10.

The steering boost 14 is preferably set up to adapt a steering ratio between the steering transducer 10 and the at least one steering cylinder 2*a, b* on the basis of the detected external signal. In particular, the steering boost 14 is set up to increase this steering ratio when a predetermined external signal is detected such that, when the steering transducer 10 is actuated, a correspondingly greater adjustment of the steering cylinders 2*a, b* and, therefore, of the steering angle 3 takes place. In particular, the adaptation is carried out when the detected external signal fulfills a predetermined condition and, for example, exceeds a limit value. If this external signal is no longer present, the increase of the steering ratio is halted again.

It is also preferable that the steering boost 14 is set up to adapt a turning circle diameter of the agricultural vehicle 1 on the basis of the detected external signal. The turning circle diameter also is an adjustment characteristic of the steering transducer 10 in the above-described sense.

The adaptation of the adjustment characteristic is tailored to special, previously defined situations or environmental states. In this case, the steering boost 14 is preferably set up in such a way that, based on the detected external signal, a default setting is selected from a large number of stored default settings and the adjustment characteristic is adapted in accordance with the selected default setting. According to the exemplary embodiment represented in FIG. 1, the steering boost 14 comprises an electronic steering module 14*a*, which, in turn, comprises a suitable data memory and processes the signals from the sensor system 15 in such a way that a default setting is selected and the adjustment characteristic is adapted. Preferably, each of the stored default settings is assigned to an environmental state. Such environmental states are explained below by way of example.

According to the exemplary embodiment represented in FIG. 1, the main steering valve 9 is a hydraulic main steering valve 9 having a fixed valve ratio. In this case, a fixed valve ratio means that the relationship between the actuation of the main steering valve 9 and the volume of introduced hydraulic fluid according to the description above is constant and, therefore, cannot be changed. This relationship does not need to be linear, however. In particular, the main steering valve 9, which also is represented, is the steering unit 9*a*. The steering unit 9*a* has the advantage that an actuation of the steering unit 9*a* results in a supply of hydraulic fluid even if the pump 13*a* fails, and therefore effective steering of the agricultural vehicle 1 is also basically possible in such a situation.

According to an alternative option, the main steering valve 9 may be implemented as an electrohydraulic main steering valve 9 having an electrically adjustable valve ratio. In contrast to the steering unit 9*a* described above, in an electrohydraulic main steering valve 9, the valve ratio is electrically changed in the sense described above. This option has the advantage that the adaptation of the adjustment characteristic according to the invention is implemented purely by an electric activation of the main steering valve 9. In particular, the steering boost 14 can be set up to adjust the valve ratio of the electrohydraulic main steering valve 9 on the basis of the detected external signal.

According to one option, which is represented in FIG. 1, the steering system comprises a hydraulic auxiliary valve 16 for applying pressure to the at least one steering cylinder 2*a*, *b*. This hydraulic auxiliary valve 16 basically interacts with the first hydraulic line 11*a* and the second hydraulic line 11*b* in the same manner as the main steering valve 9, and therefore the hydraulic auxiliary valve 16 can change the position of the piston rods 7*a*, *b* and, therefore, influence the steering angle 3 in an analogous manner. The statements made above in this regard with respect to the main steering valve 9 apply by analogy equally to the hydraulic auxiliary valve 16.

The hydraulic auxiliary valve 16 according to the representation in FIG. 1 is preferably an electrohydraulic auxiliary valve. This electrohydraulic auxiliary valve is brought into a blocking position 16*a*, a first switching position 16*b* or into a second switching position 16*c* via electric activation. If the electrohydraulic auxiliary valve is in the first switching position 16*b*, hydraulic fluid is introduced into the first hydraulic line 11*a*. Conversely, provided the electrohydraulic auxiliary valve is in the second switching position 16*c*, hydraulic fluid is introduced into the second hydraulic line 11*b*. A reverse flow of hydraulic fluid occurs via the respective other, first or second hydraulic line 11*a*, *b*. In the blocking position 16*a*, the electrohydraulic auxiliary valve is blocked.

According to an embodiment, the hydraulic auxiliary valve 16 is set up to act upon the at least one steering cylinder 2*a*, *b* with a controllable volume of hydraulic fluid. This control then takes place, as described above, via the electrical adjustment of the duration for which the hydraulic auxiliary valve 16 is in the first switching position 16*b* or in the second switching position 16*c*. This control is carried out, in particular, by the steering module 14*a*. For the purpose of such a control, the steering system according to the invention also preferably comprises a wheel angle sensor 17 for detecting the steering angle 3, which wheel angle sensor 17 is connected to the steering boost 14 for communication purposes.

According to the invention, the steering boost 14 is set up to activate the hydraulic auxiliary valve 16 on the basis of the detected environmental state in order to adapt the adjustment characteristic and, in particular, the steering ratio. This can take place, therefore, by the steering boost 14 activating the hydraulic auxiliary valve 16 depending on the detected external signal and the actuation of the steering transducer 10 in such a way that more hydraulic fluid is introduced selectively into the first hydraulic line 11*a* or into the second hydraulic line 11*b* than would be the case if only the main steering valve 9 were actuated. The steering ratio therefore increases.

It also is possible for the steering boost 14 to be set up to adapt a steering angle adjustment time of the steering transducer 10. Basically, this adaptation can take place by providing and correspondingly activating the above-described hydraulic auxiliary valve 16.

According to an embodiment, the steering system comprises the aforementioned pressure supply source 13 having an adjustable capacity, preferably, therefore, the aforementioned pump 13*a* and the pump motor 13*b*, for supplying pressure to the main steering valve 9. The rotational speed, in particular, of the pump motor 13*b* is adjusted. In order to adapt the steering angle adjustment time of the steering transducer 10 in particular, the steering boost 14 is set up to adjust the capacity of the pressure supply source 13 on the basis of the detected external signal by the rotational speed of the pump motor 13*b*, for example.

According to the exemplary embodiment represented in FIG. 1, the steering system can also comprise another pressure supply source 18 and, in particular, another pump 18*a* for the pressure supply of the hydraulic auxiliary valve 16, which is separate from the initially mentioned pressure supply source 13. In this case, the steering boost 14 can also be set up to adjust the capacity of the further pressure supply source 18 on the basis of the detected external signal, specifically preferably independently of the capacity of the pressure supply source 13. To this end, as represented in FIG. 1, an auxiliary line system 12*a* is provided, which is connected to the main line system 12 only by a fluid tank 19 and is therefore independent. The further pump 18*a* is driven by a separate pump motor or, as represented in FIG. 1, by the pump motor 13*b* of the initially mentioned pressure supply source 13.

The sensor system 15 preferably comprises an electromagnetic sensor device and preferably a camera device 15*a* as represented in FIG. 1, a laser sensor device and/or a radar device.

Figure 2:
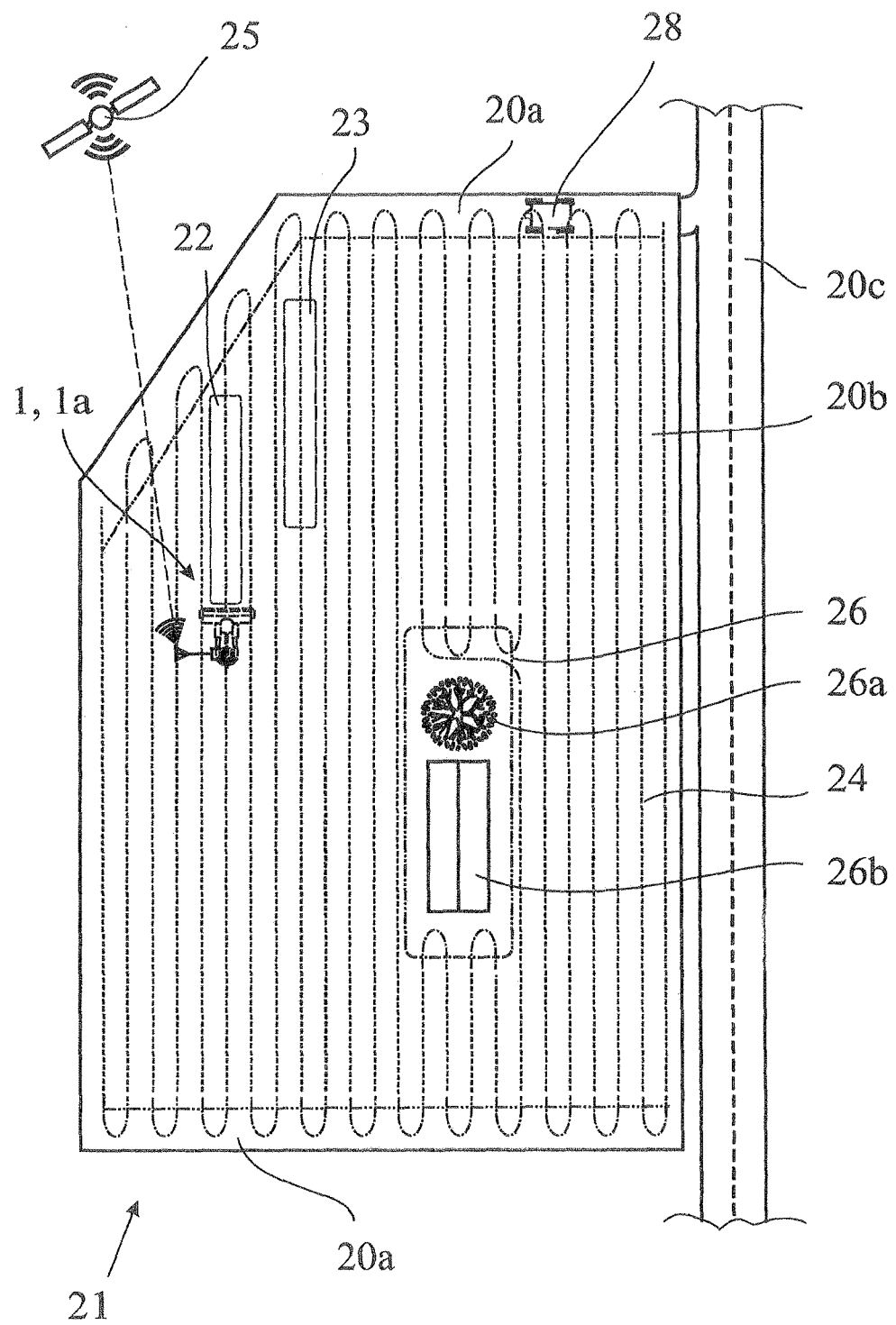
FIG. 2 shows a schematic view of an agricultural field, which is worked by an agricultural vehicle comprising the proposed steering system from FIG. 1.

As was already described above, it is advantageous to support the steering procedure of the agricultural vehicle 1 by adapting the adjustment characteristic, in particular, the steering ratio, in a headland area 20a of an agricultural field 21, as is represented in FIG. 2 by way of example. Conversely, such support is not required, or is only required to a lesser extent, in a crop area 20b of the agricultural field 21. This also applies for a road area 20c, wherein this term can also apply to all areas outside of headland areas 20a and crop areas 20b. The sensor system 15 is therefore preferably set up to subdivide a path section 22 to be driven along into a large number of terrain types on the basis of the external signal. In particular, the adjustment characteristic is adapted on the basis of this subdivision.

This path section 22 to be driven along is an area or a distance in the geometric sense, which is simply located in front of the agricultural vehicle 1 preferably in the current direction of travel. This path section 22 also can be a set wheel track section 23. In this case, a set wheel track section 23 is understood to be a path section 22, which is located on a set driving path 24 for the agricultural vehicle 1, which set driving path 24 is predetermined and has not yet been driven along and was created by a route planning method, for example. As represented in FIG. 2, this set wheel track section 23 also can be disposed so as to be offset relative to the current direction of travel of the agricultural vehicle 1, wherein the steering module 14, having knowledge of the set driving path 24, can orient the sensor system 15 in order to detect this set wheel track section 23, which may be offset. The large number of terrain types in which the subdivision is carried out preferably comprises a headland area 20a, a crop area 20b, and/or a road area 20c.

A possibility for distinguishing between various terrain types is based on the detection of a crop type and/or a crop density, which corresponds to the crop density of a particular type of crop in this case. The sensor system 15 is therefore set up to detect a crop type and/or a crop density. This can be, in particular, a crop type and/or a crop density on the path section 22 to be driven along or on the set wheel track section 23. Preferably, the aforementioned subdivision is then carried out on the basis of the detected crop type and/or the crop density and, further preferably, the adaptation of the adjustment characteristic is carried out on the basis of this subdivision.

As an alternative, the subdivision of the path section 22 to be driven along or of the set wheel track section 23 into the large number of terrain types can also be based on position information, wherein the sensor system 15 then comprises a positioning system, e.g., a receiver for a satellite navigation system 25. This position information can then be related to the terrain types or also to the aforementioned set driving path 24 on the basis of map data, for example.

Another situation in which an adaptation of the adjustment characteristic, e.g., by increasing the steering ratio, is advantageous sets in when the agricultural vehicle 1 is supposed to execute an evasive maneuver. Such an evasive maneuver can apply for an obstacle 26, which can be stationary obstacles 26 in particular. FIG. 2 shows a tree 26a and a building 26b as examples of such obstacles 26. The sensor system 15 is therefore preferably set up to detect an obstacle 26 in a path section 22 to be driven along, which preferably is a set wheel track section 23. The adaptation of the adjustment characteristic is then preferably based on the detected obstacle 26. In this case it is further preferred that the steering boost 14 is set up to adapt the adjustment characteristic on the basis of the detected obstacle 26 such that a non-worked area size is optimized, wherein this optimization can be a minimization in particular. This non-worked area size refers to the area of the agricultural field 21 and, in particular, of the crop area 20b, which remains unworked by the agricultural vehicle 1 due to the obstacle 21.

Figure 3:
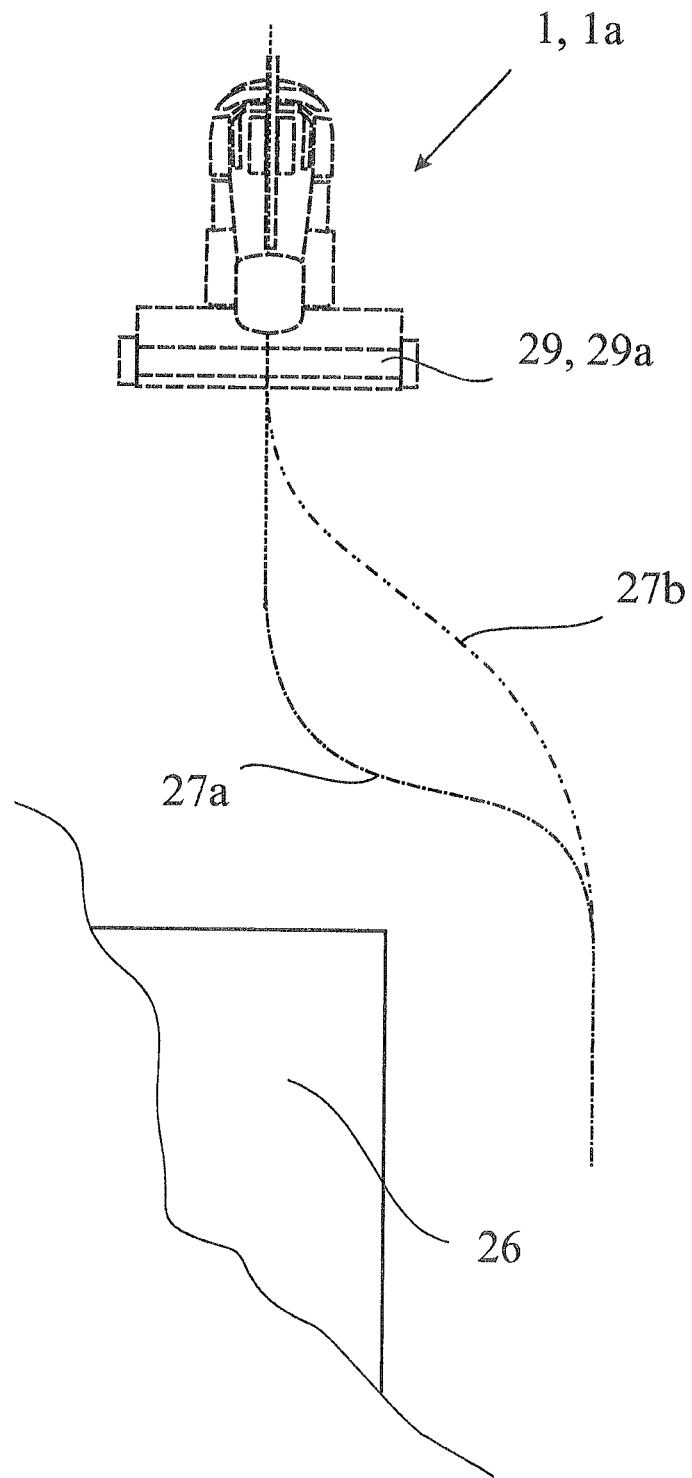
FIG. 3 shows a comparison between an evasive movement of an agricultural vehicle comprising the steering system from the prior art and one comprising the proposed steering system from FIG. 1.

FIG. 3 clearly shows how an agricultural vehicle 1 can adapt the adjustment characteristic, in the sense described above, by such a detection of an obstacle 26 and by a steering system according to the invention such that said agricultural vehicle can drive along an improved evasive track 27a in order to evade an obstacle 26. As compared to the conventional evasive track 27b, this improved evasive track 27a permits closer travel to the obstacle 26 and therefore reduces the area of the agricultural field 21 around the obstacle 26 that will not be worked or will be merely ineffectively worked. This is made possible, in particular, by increasing the steering ratio and reducing the steering angle adjustment time upon detection of the obstacle 26.

Evasion may be necessary not only in the case of such stationary obstacles 26, but also with respect to another vehicle, which is referred to here and in the following as a foreign vehicle 28. The sensor system 15 is therefore preferably set up to detect a foreign vehicle such as agricultural vehicle 28 (FIG. 2). That is, a grain hauling vehicle 28 is shown in the headland area 20a in FIG. 2 as an example of such a foreign vehicle 28. The sensor system 15 preferably is set up to detect a distance to the foreign vehicle 28. The adaptation of the adjustment characteristic is then preferably based on the detected foreign vehicle 28 or on the detected distance to the foreign vehicle 28.

However, the adaptation of the adjustment characteristic does not necessarily have to be specified exclusively by the detected external signal, as was described above, but rather merely needs to be based thereon. With respect to the above-described evasive maneuvers with regard to obstacles 26 or foreign vehicles 28 in particular, it makes sense to additionally adapt the adjustment characteristic on the basis of a geometry, a ground speed, or an orientation of the agricultural vehicle 1 relative to the obstacle 26 or the foreign vehicle 28, in particular.

It also is possible to detect, on the basis of certain types of implements, possibly in combination with additional state information, in which type of terrain, e.g., a headland area 20a, the agricultural vehicle 1 is currently located. In the case of harvesting machines, a front harvesting attachment is usually raised in the headland. It is assumed that the agricultural vehicle 1 is located in a headland area 20a when such a front harvesting attachment is raised and, simultaneously, the speed of a main engine of the agricultural working vehicle 1 is in a working speed range, instead of an idle speed range. Therefore, the sensor system 15 is preferably set up to detect a state signal, in particular a working position signal, of an implement 29, preferably a front attachment 29a that is detachably coupled to the agricultural vehicle 1. Such a working position signal therefore refers to a signal, which indicates a particular operating position, including, e.g., a working position, a transport position, or a maintenance position, of the implement 29. The adaptation of the adjustment characteristic is then preferably based on the detected state signal or working position signal. On the basis of the aforementioned separable coupling, it is deduced that the state signal and, in particular, the working position signal, is an external signal.

LIST OF REFERENCE NUMBERS 1 agricultural vehicle
1a combine harvester
2a, b steering cylinder 3 steering angle
4 rear axle
5a, b wheel support
6a, b wheel
7a, b piston rod
8a, b cylinder housing
9 main steering valve
10 steering transducer
10a steering wheel
11a, b hydraulic line
12 main line system
12a auxiliary line system
13 pressure supply source
13a pump
13b pump motor
14 steering boost
14a steering module
15 sensor system
16 auxiliary valve
16a blocking position
16b, c switching positions
17 wheel angle sensor
18 further pressure supply source
18a further pump
19 fluid tank
20a headland area
20b crop area
20c road area
21 agricultural field
22 path section
23 set wheel track section
24 set driving path
25 satellite navigation system
26 obstacle
26a tree
26b building
27a improved evasive track
27b conventional evasive track
28 foreign vehicle
28a grain hauling vehicle
29 implement
29a front attachment As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A steering system for an agricultural vehicle, comprising:
    at least one steering cylinder for changing a steering angle of the agricultural vehicle;
    a hydraulic main steering valve for pressurizing the at least one steering cylinder;
    a steering transducer for actuating the main steering valve;
    a steering boost for adjusting or controlling an adjustment characteristic between the steering transducer and the at least one steering cylinder; and
    a sensor system for detecting an external signal of the agricultural vehicle;
    wherein the steering boost controls the adjustment characteristic based on the detected external signal in such a way that a steering ratio between the steering transducer and the at least one steering cylinder is controlled on the basis of the detected external signal; and
    wherein the sensor system subdivides a path section to be driven into a number of terrain types on the basis of the external signal.

2. The steering system according to claim 1, wherein the steering boost adjusts a turning circle diameter of the agricultural vehicle on the basis of the detected external signal.

3. The steering system according to claim 1, wherein the steering boost selects a default setting, on the basis of the detected external signal, from a large number of stored default settings, and wherein the stored default settings are each preferably assigned to an environmental state, and to adjust or control the adjustment characteristic according to the selected default setting.

4. The steering system according to claim 1, further comprising a hydraulic auxiliary valve for pressurizing the at least one steering cylinder, wherein the hydraulic auxiliary valve acts upon the at least one steering cylinder with a controllable volume of hydraulic fluid.

5. The steering system according to claim 4, wherein the steering boost activates the hydraulic auxiliary valve on the basis of the detected external signal in order to adjust or control the steering ratio.

6. The steering system according to claim 1, wherein the steering boost adjusts or controls a steering angle adjustment time of the steering transducer.

7. The steering system according to claim 1, further comprising a pressure supply source comprising a pump and a pump motor having an adjustable speed, for supplying pressure to the main steering valve, wherein the steering boost adjusts the capacity of the pressure supply source on the basis of the detected external signal.

8. The steering system according to claim 1, wherein the sensor system comprises one or more of the following: an electromagnetic sensor system, a camera device, a laser sensor device and a radar device.

9. The steering system according to claim 1, wherein the sensor system detects an obstacle in a path section to be driven along and wherein the steering boost adjusts or controls the adjustment characteristic on the basis of the detected obstacle in such a way that a non-worked area size is optimized.

10. The steering system according to claim 1, wherein the sensor system detects a foreign vehicle and a distance to the foreign vehicle.

11. The steering system according to claim 1, wherein the sensor system detects a state signal of an implement associated with the agricultural vehicle.

12. The steering system according to claim 11, wherein the state signal is a working position of the implement.

13. The steering system according to claim 11, wherein the implement is a front attachment and the state signal is a working position of the front attachment.

14. A steering system for an agricultural vehicle, comprising:
    at least one steering cylinder for changing a steering angle of the agricultural vehicle;
    a hydraulic main steering valve for pressurizing the at least one steering cylinder;
    a steering transducer for actuating the main steering valve;
    a steering boost for adjusting or controlling an adjustment characteristic between the steering transducer and the at least one steering cylinder; and a sensor system for detecting an external signal of the agricultural vehicle;

wherein the steering boost controls the adjustment characteristic based on the detected external signal in such a way that a steering ratio between the steering transducer and the at least one steering cylinder is controlled on the basis of the detected external signal; and wherein the sensor system detects a crop density on a path section to be driven along.

15. The steering system according to claim 14, wherein the sensor system detects a foreign vehicle and a distance to the foreign vehicle.

16. The steering system according to claim 14, wherein the sensor system detects a state signal of an implement associated with the agricultural vehicle.

17. The steering system according to claim 16, wherein the state signal is a working position of the implement.

18. The steering system according to claim 16, wherein the implement is a front attachment and the state signal is a working position of the front attachment.

19. A steering system for an agricultural vehicle, comprising:

at least one steering cylinder for changing a steering angle of the agricultural vehicle;

a hydraulic main steering valve for pressurizing the at least one steering cylinder;

a steering transducer for actuating the main steering valve;

a steering boost for adjusting or controlling an adjustment characteristic between the steering transducer and the at least one steering cylinder; and a sensor system for detecting an external signal of the agricultural vehicle;

wherein the steering boost controls the adjustment characteristic based on the detected external signal in such a way that a steering ratio between the steering transducer and the at least one steering cylinder is controlled on the basis of the detected external signal;

wherein the sensor system subdivides a path section to be driven into a number of terrain types on the basis of the external signal; and wherein the main steering valve is a hydraulic main steering valve having a fixed ratio or an electrohydraulic main steering valve having an electrically adjustable valve ratio whereby the steering boost is set up to adjust the valve ratio of the electrohydraulic main steering valve on the basis of the detected external signal.

\* \* \* \* \*